(12) United States Patent
Dow et al.

(10) Patent No.: US 7,070,042 B2
(45) Date of Patent: Jul. 4, 2006

(54) BLADE PULLEY

(75) Inventors: Paul W. Dow, Byron, NY (US); Steven S. Dow, Byron, NY (US)

(73) Assignee: Oxbo International Corporation, Byron, NY (US)

( * ) Notice: Subject to any disclaimer, the term of this patent is extended or adjusted under 35 U.S.C. 154(b) by 206 days.

(21) Appl. No.: 10/405,073

(22) Filed: Mar. 31, 2003

(65) Prior Publication Data

US 2004/0188228 A1 Sep. 30, 2004

(51) Int. Cl.
*B65G 35/10* (2006.01)

(52) U.S. Cl. .......................................... 198/835; 193/37
(58) Field of Classification Search ................ 198/835; 193/37; 474/185
See application file for complete search history.

(56) References Cited

U.S. PATENT DOCUMENTS

| | | | |
|---|---|---|---|
| 77,295 A | 4/1868 | Krausch | |
| 369,023 A | 8/1887 | Newell | |
| 417,512 A | 12/1889 | Rosquist | |
| 455,799 A | 7/1891 | Norlin | |
| 855,899 A | 6/1907 | Mercer | |
| 1,235,656 A | 8/1917 | Cobb | |
| 1,544,192 A | 6/1925 | Smith | |
| 1,691,993 A | * 11/1928 | Rogers | 474/185 |
| 1,818,297 A | 8/1931 | Bowlus | |
| 2,023,611 A | 12/1935 | Neuman | |
| 2,232,623 A | 2/1941 | Neuman | |
| 2,236,027 A | * 3/1941 | Bowen et al. | 474/96 |
| 2,356,026 A | 8/1944 | Berry | |
| 2,687,209 A | 8/1954 | Rost et al. | |
| 2,787,913 A | 4/1957 | Hageline | |
| 3,016,235 A | 1/1962 | Cnude | |
| 3,046,805 A | 7/1962 | Van Gorp | |
| 3,055,229 A | 9/1962 | Mecham | |
| 3,274,707 A | 9/1966 | Garden | |
| 3,275,126 A | 9/1966 | Hartzell, Jr. | |
| 3,297,147 A | 1/1967 | Sackett, Sr. | |
| 3,753,488 A | 8/1973 | Wilson | |
| 3,948,114 A | 4/1976 | Koinzan | |
| 4,089,784 A | * 5/1978 | Ettelt et al. | 210/526 |
| 4,489,827 A | 12/1984 | Anderson | |
| 4,540,389 A | 9/1985 | Ramsey | |
| 4,643,294 A | 2/1987 | Whited | |
| 4,721,497 A | 1/1988 | Jager | |
| 4,757,576 A | 7/1988 | Jaubert | |
| 4,836,361 A | * 6/1989 | Herren | 198/843 |
| 4,906,226 A | 3/1990 | Hecker et al. | |
| 4,956,914 A | 9/1990 | Valster et al. | |
| 5,011,003 A | 4/1991 | Gladding | |
| 5,114,001 A | 5/1992 | Anderson | |
| 5,232,407 A | 8/1993 | Wolf et al. | |
| 5,449,063 A | * 9/1995 | Thomas, Sr. | 198/834 |
| 5,632,701 A | 5/1997 | Neel | |
| 5,979,639 A | 11/1999 | Sytema | |
| 6,053,308 A | 4/2000 | Vogrig et al. | |
| 6,216,849 B1 | 4/2001 | Sytema | |
| 6,238,131 B1 | 5/2001 | Watts et al. | |

FOREIGN PATENT DOCUMENTS

DE     G 86 13 942.8 U1     10/1986

* cited by examiner

*Primary Examiner*—Douglas Hess
(74) *Attorney, Agent, or Firm*—Merchant & Gould P.C.

(57) ABSTRACT

A bladed pulley including a plurality of blades extending from a first end to a second end. The bladed pulley having spaced apart blades and an open, central volume configuration to permit conveyed material to fall through the pulley. The bladed pulley further having an orienting structure designed to radially orient and position each of the blades about a longitudinal axis.

18 Claims, 7 Drawing Sheets

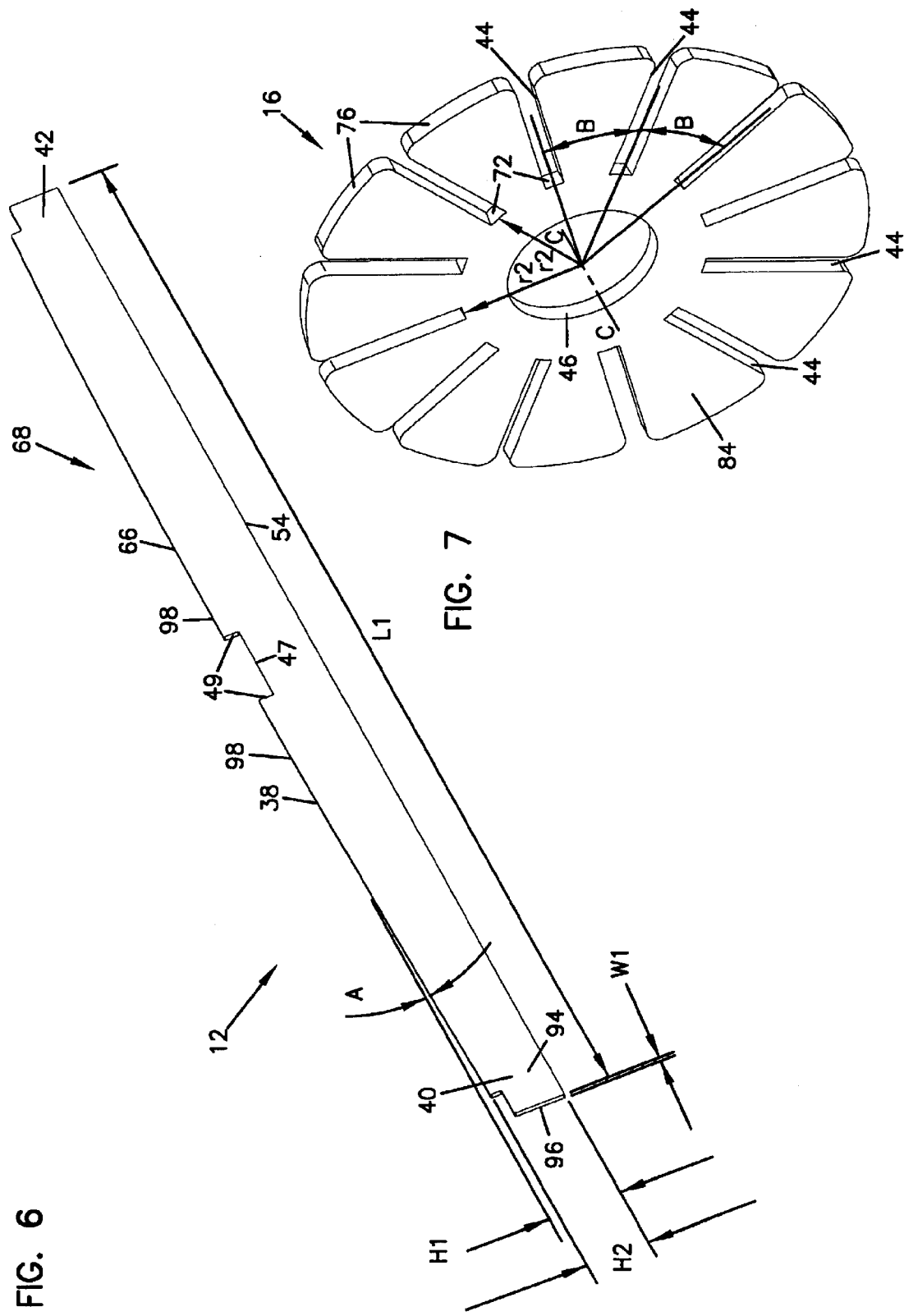

US 7,070,042 B2

BLADE PULLEY

TECHNICAL FIELD

This disclosure relates generally to pulleys such as are used with belt conveyors. More particularly, this disclosure relates to a blade pulley, and method of making the same.

BACKGROUND

The following disclosure relates generally to conveyor pulleys, sometimes referred to as rollers. Pulleys can be used with a conveyor, typically a belt conveyor, in either a driving arrangement, an idling arrangement, or a tensioning arrangement. The belt conveyor is typically arranged in a loop configuration, conveying material along the outer top surface of the belt. Use of belt conveyors often results in some of the conveyed material falling from the belt onto the inner, lower surface of the belt. Problems arise when the fallen material works its way toward the pulleys, whether the idler, the driver, or the tensioning pulley. In some cases, the fallen material becomes entangled about the circumference of the pulley causing damage to the belt and the pulley itself. In other cases, the fallen material becomes entangled with a central shaft extending between ends of the pulley, causing damage to the bearings or drive components of the pulley. Even if an operator discovers the fallen material prior to sustaining equipment damage, unclogging material entanglement and build up results in equipment down time, thereby decreasing efficiency and productivity.

Various pulley designs have come about in an attempt to address some of these problems. In general, improvement has been sought with respect to such designs generally to: better accommodate manufacturing processes, reduce overall pulley weight, improve structural integrity of the pulley, and increase productivity by eliminating material build up. The present invention addresses these and other problems associated with conveyor pulleys.

SUMMARY

One aspect of the present invention relates to a pulley for use with a conveyor belt having a first hub positioned at a first end and a second hub positioned at a second end. The pulley includes a plurality of blades having a first end and a second end that are mounted to the corresponding first and second hubs. An orienting member is located at an intermediate section of the blades. The orienting member includes a plurality of slots to radially orient the blades of the pulley.

Another aspect of the present invention relates to a bladed pulley defining a central volume. The bladed pulley includes blades supported by rotary arrangements at opposite ends of the pulley, the pulley including first and second axles also supported by the rotary arrangement, the first and second axles not extending into the central volume of the pulley.

Still another aspect of the present invention relates to a pulley having a configuration that permits conveyed material to fall through a center volume of the pulley. The pulley includes a plurality of open regions defined between a plurality of blades, the open regions extending radially from the center volume. The center volume further being free of longitudinal obstructions to facilitate passage of conveyed material through the pulley.

Yet another aspect of the present invention relates to method of tensioning a conveyor belt that can be used with a pulley arrangement. The method includes connecting first and second ends about the pulley arrangement with a hinged connection and adjusting the tensioning of the belt by adjusting the pulley arrangement and pivoting the hinged connection.

These features of novelty and various other advantages, which characterize the invention, are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 is a perspective view of a blade of the bladed pulley, shown in FIG. 3;

FIG. 7 is a perspective view of a bulkhead shown in FIG. 3;

DETAILED DESCRIPTION

With reference now to the various figures in which identical elements are numbered identically throughout, a description of various exemplary aspects of the present invention will now be provided.

I. Overview of the Pulley Device and Use

In general, the present invention relates to a bladed pulley for use with a conveyor system. In typical applications, the conveyor system includes a rubber belt and one or more conveyor pulleys. Conventional conveyor pulleys are generally small in diameter and have a solid, welded construction. A center Vee-groove formed in the pulley construction is often used to guide or "track" the belt. The belt commonly has a corresponding Vee-guide molded in an inner surface. Pulleys and belt conveyors of this type have been used in many different applications and industries.

The bladed pulley of the present invention is directed toward use in the agricultural industry. In particular, the bladed pulley can be used on stationary or transportable agricultural equipment such as a windrow merger machine. Although the bladed pulley describe herein is described in use with equipment of the agricultural industry, it is to be understood that the principles disclosed can be applied to many other types of industries employing conveyor belt and pulley arrangements.

To generally understand the operation of the disclosed bladed pulley, the bladed pulley of the present invention will now be described in an exemplary use context; in particular in use with a windrow merger machine.

Figure 1:
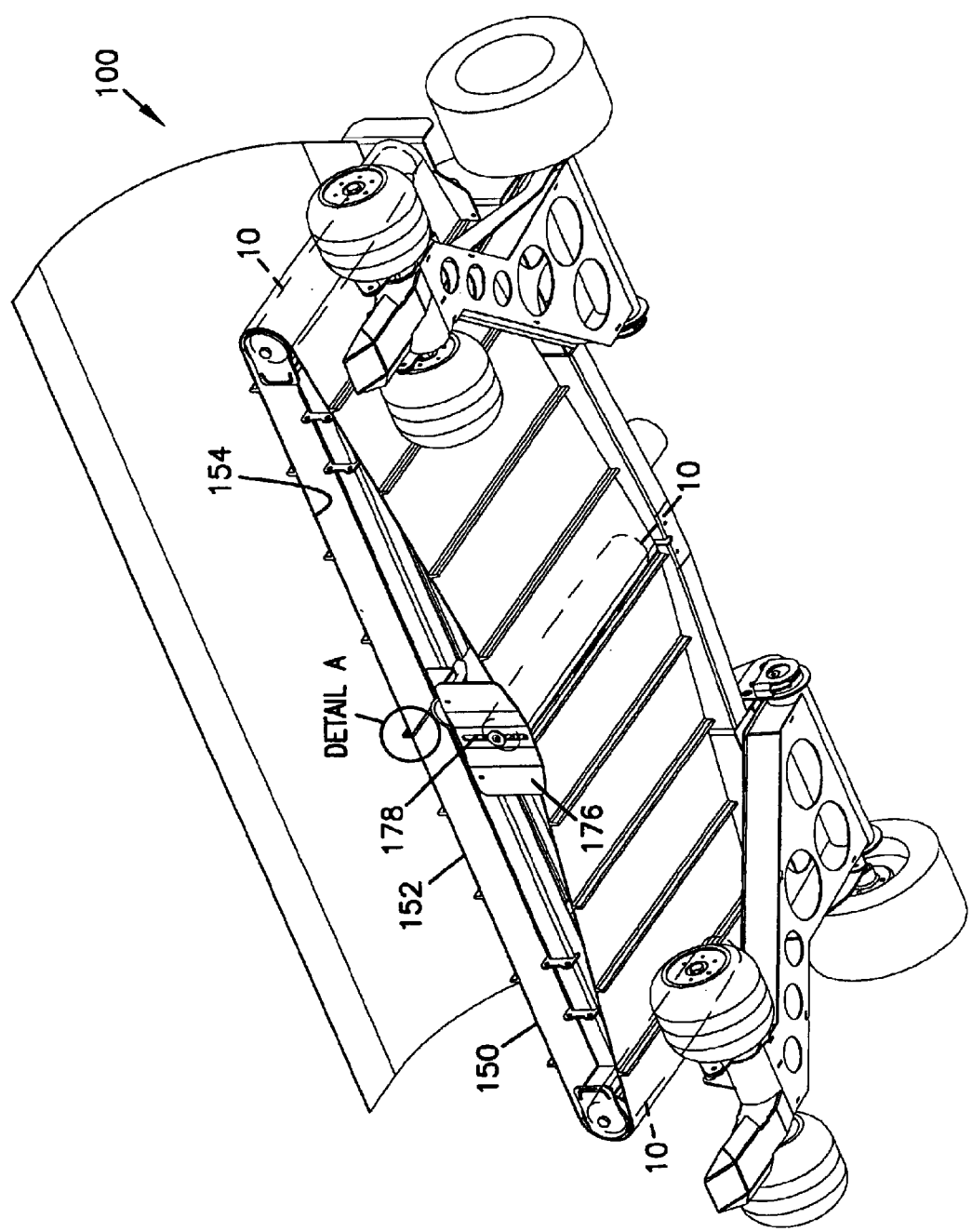
FIG. 1 is bottom, front perspective view of a first embodiment of a conveyor system including a bladed pulley in accordance with the principles of the present disclosure.
Figure 2:
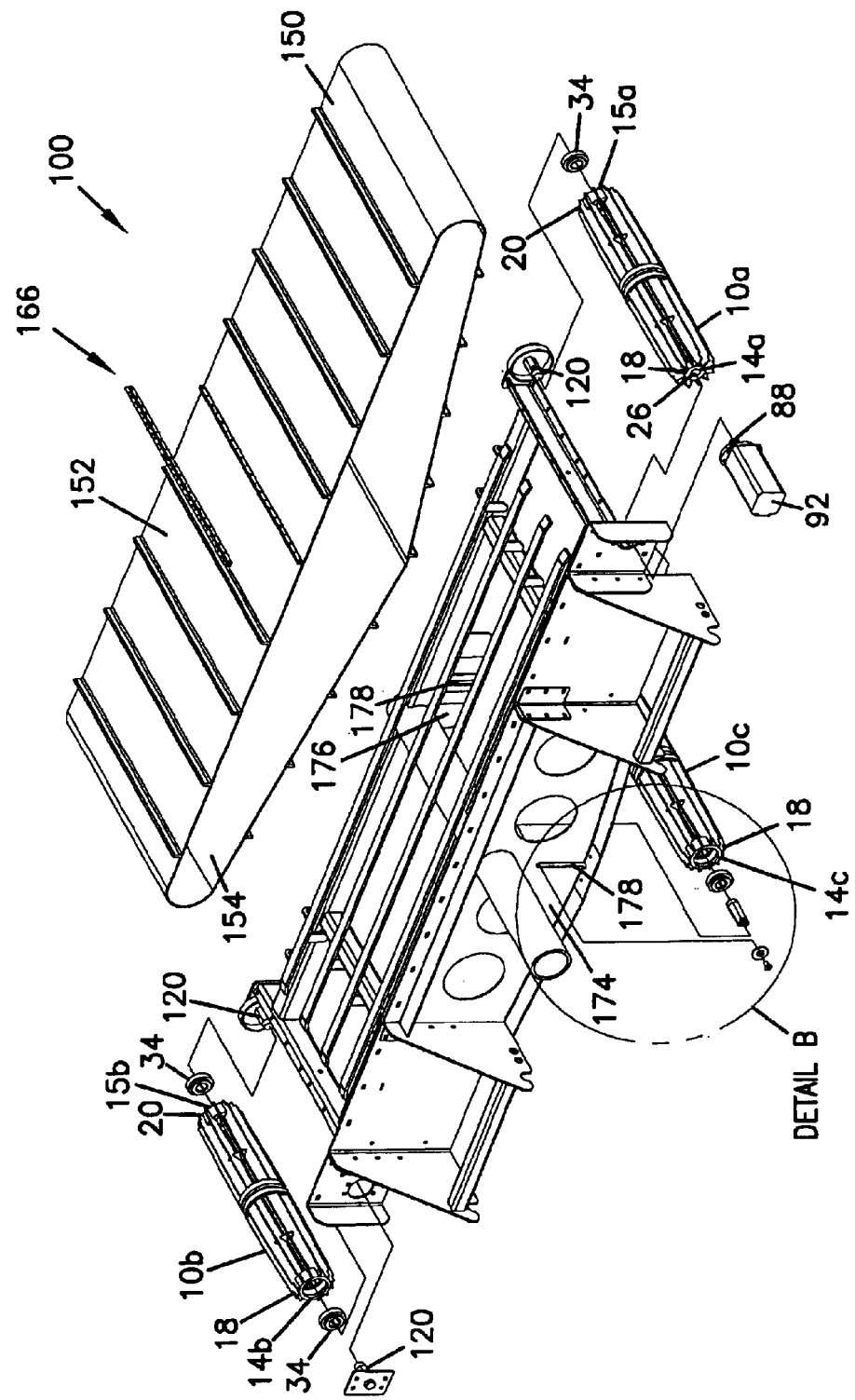
FIG. 2 is a partially shown, exploded top, rear perspective view of the conveyor system of FIG. 1.

FIGS. 1 and 2 illustrates one conveying arrangement 100 that can be used on a windrow merger machine. The arrangement includes a conveyor belt 150 and a plurality of bladed pulleys 10. In use with the windrow machine, the bladed pulleys 10 are used in combination with the conveyor belt 150 to transfer plant crops, such as hay, alfalfa, or straw, for example, from one conveyor belt to another, or to equipment where the plant crop is processed.

The plant crop is transferred along a top outer surface 152 of the belt 150. In typical arrangements, the belt 150 travels around at least two pulleys 10. Commonly, one of the pulleys is a drive pulley and the other a follower or an idler pulley. Pulley and conveyor arrangements generally require some type of tensioning device to assist in assembling the conveyor belt and provide adjustment for proper belt tensioning and belt tracking. Belt tracking is a term referring to a belt's tendency to move side to side or to heavily crowd one side of the pulley. In some arrangements either the drive pulley or the idler pulley of the conveyor are adjustable to set or adjust belt tension. In the illustrated arrangement of FIG. 2, three pulleys are provided: a fixed drive pulley 10a, a fixed idler pulley 10b, and a tensioning pulley 10c. The tensioning pulley 10c is mounted at each end to slotted support structures 174, 176. The slotted support structures 174, 176 include slots 178 configured to position the tensioning pulley 10c. In the illustrated embodiment, the tensioning pulley 10c is freely supported within the slots 178 such that belt tension is provided by the weight of the pulley (i.e. the tensioning pulley is a gravity tensioning pulley). It is also contemplated that the tensioning pulley can be configured with a securing arrangement configured to secure the pulley 10c at any position along slots 178 of the support structures 174, 176 to increase or lessen the tension in the conveyor belt 150.

Figure 10:
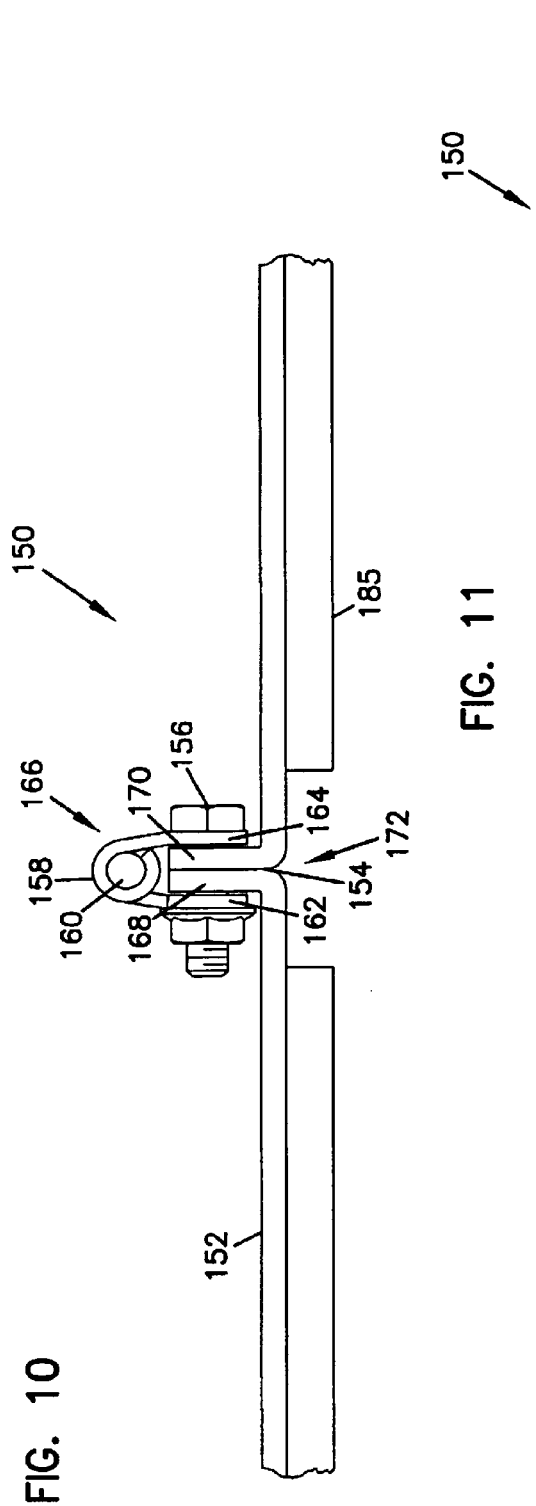
FIG. 10 is an enlarged, side elevational, diagrammatic representation of Detail A shown in FIG. 1, illustrating a connection of a conveyor belt in accordance with the principles of the present disclosure.
Figure 11:
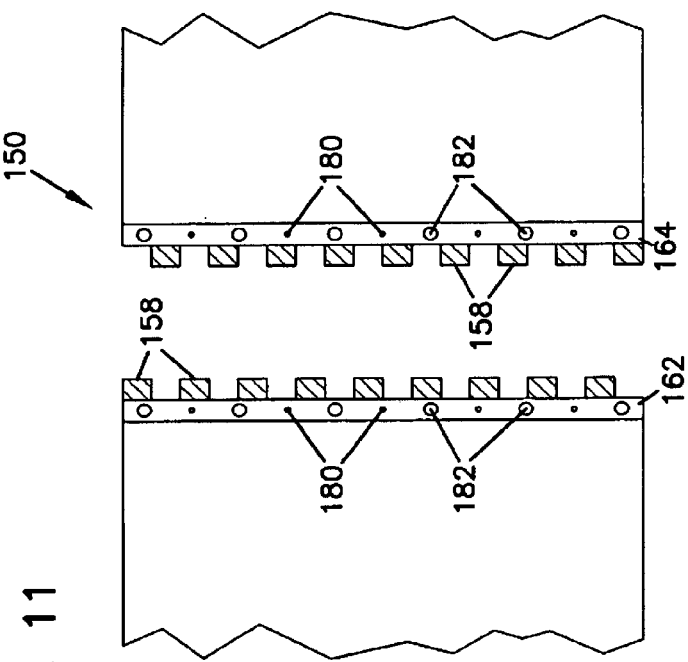
FIG. 11 is a top plan, diagrammatic representation of the conveyor belt shown in FIG. 10.

Referring now to FIG. 10, the conveyor belt 150 of the present invention includes a seam or union 172 at which first and second ends 168 and 170 of the belt 150 are joined. The union 172 has a hinge connection 166 including a first hinge member or extension 162 fastened to the first end 168 of the belt 150, and a second hinge member or extension 164 fastened to the second end 170 of the belt. The first and second extension 162, 164 may be fastened to the first and second ends 168, 170 by rivets (not shown), for example. Each of the first and second extensions 162, 164 includes lacing or a plurality of eyelets 158 (FIG. 11) that mesh when the ends are connected.

In use, the belt 150 is positioned about the pulleys 10a–10c and the ends 168, 170 are brought together to mesh the eyelets 158 of each extension 162, 164. A pin 160 (FIG. 10) is inserted within each eyelet 158 of the meshed first and second extensions 162, 164. At this point, the belt has slack to allow a user to adjust the positioning of the belt 150 in relation to the pulleys 10a–10c. The tensioning pulley 10c can then be positioned within the slots 178 of the support structures 174, 176 to tension the belt by taking-up any undesired slack.

When the belt is properly positioned in relation to the pulleys and the belt is adequately tensioned, the final belt length is accomplished by folding or pivoting the extensions 162, 164 toward one another (as shown in FIG. 10). Bolts 156 are inserted through holes 182 formed in the extensions 162, 164 of the hinge connection 166 and ends 168, 170 of the belt 150. The bolts 156 are secured such that an inner surface 154 of each of the ends 168, 170 is in contact. This hinge connection 166 permits a single user to easily install and adjust the conveyor belt 150 while providing a strong connection along the union 172 of the ends 168, 170.

Figure 3:
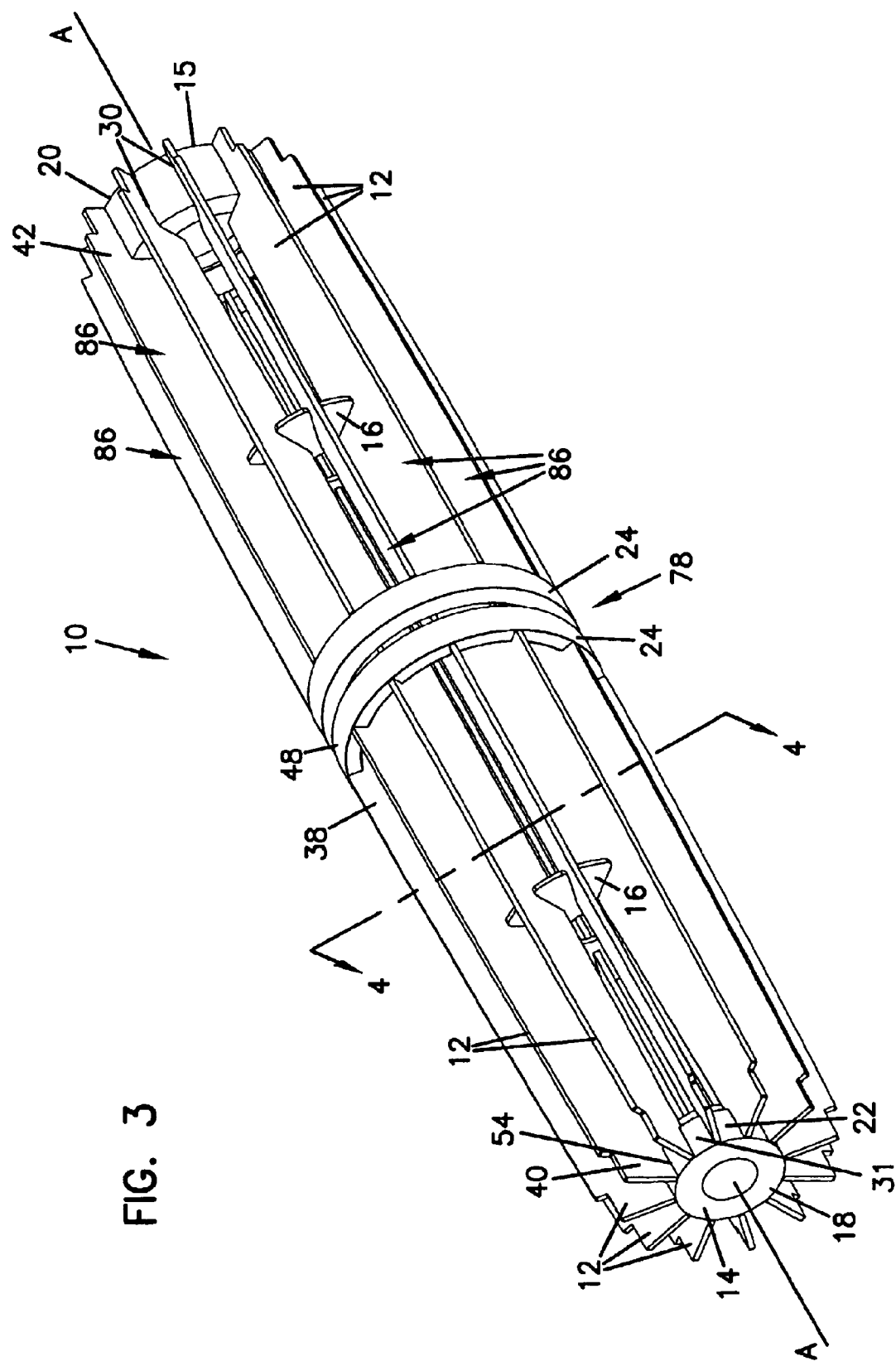
FIG. 3 is a perspective view of a first embodiment of the bladed pulley in accordance with the principles of the present disclosure.

Referring now to FIG. 3, the bladed pulley 10 of the present invention provides several advantages over conventional pulley designs. One advantage is that the bladed pulley 10 includes a plurality of blades 12 arranged and configured to chop up fallen material that would otherwise entangle or wrap around conventional pulleys. The bladed pulley 10 of the present invention further has no central shaft running from one end to the other end. Because there is no central shaft, the chopped up material can sift through the open blade design and fall free from the pulley. Yet another advantage of the present bladed design is that the disclosed blade configuration securely grips the inner surface 154 (FIGS. 1 and 2) of the conveyor belt 150 for improved drive traction. These and other advantages are discussed in greater detail hereinafter.

II. Structural Components

The bladed pulley embodiment 10 illustrated in FIG. 3 has a longitudinal axis A—A extending generally from a first end 18 to a second end 20. The bladed pulley 10 includes a plurality of blades 12 (e.g. twelve blades) projecting outward from the longitudinal axis A—A and extending from the first end 18 to the second end 20 of the pulley 10. Orienting bulkheads 16 are provided to orient and properly space the blades at intervals about the longitudinal axis A—A.

The bladed pulley 10 in accordance with the principles disclosed has an open bladed design. In an open bladed design, the bladed pulley 10 is not of a solid, enclosing construction, rather the bladed pulley 10 includes a plurality of blades 12 defining spaces or open regions 86 about the circumference of the pulley 10. The open regions extend into a central open volume 56 (clarified by a dashed line shown in FIG. 4) from which the plurality of blades 12 projects outward. The central open volume 56 is generally defined by inner edges 54 (see also FIG. 6) of the blades 12 and first and second bulkheads or hubs 14, 15.

In a preferred embodiment, the bladed pulley 10 does not include a central shaft extending through the open volume 56. Rather, the open volume 56 is generally free from obstructions to permit material to fall through the bladed pulley and reduce the likelihood of material build up and equipment downtime. With a volume generally free from obstructions, the center volume has no longitudinally extending structure, such as a shaft, about which material is likely to become entangled. In other words, the center volume is primarily open so that material passes through the center volume and is discarded or cleared from the pulley by passing through the open regions 86 between the blades 12.

Figure 5:
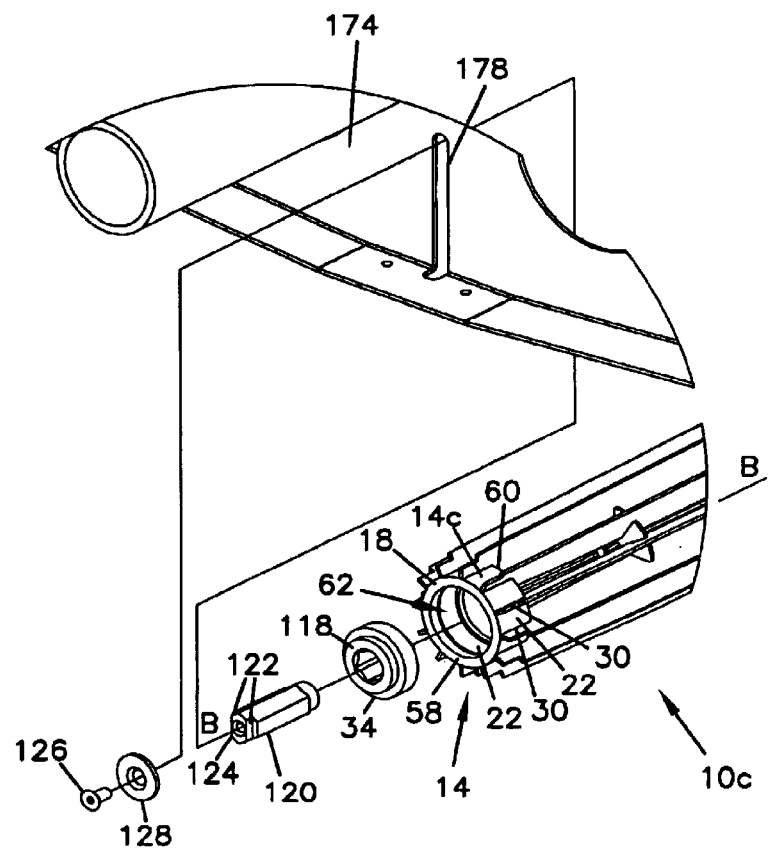
FIG. 5 is an enlarged view of detail B of FIG. 2, showing a first embodiment of a hub in accordance with the principles of the present disclosure.

As best shown in FIGS. 2 and 5, the first bulkhead or hub 14 of the bladed pulley is positioned adjacent to the first end 18 of the bladed pulley 10. The second bulkhead or hub 15 is positioned adjacent to the second end 20 of the bladed pulley 10. In the illustrated embodiment of FIG. 2, the conveying arrangement 100 includes a bladed pulley that functions as a drive pulley 10a. The drive pulley 10a is driven by a drive shaft 88 of a motor 92 that mechanically rotates or drives the bladed drive pulley 10a. When the bladed pulley 10 is configured as the drive pulley 10a, the pulley includes a drive hub 14a and a bearing hub or follower hub 15a. It is contemplated that other embodiments may include two drive hubs. Similarly, when the bladed pulley is configured as an idler or tensioning pulley, the bladed pulley embodiment may include two follower hubs. It is contemplated that a variety of drive/follower hub arrangements can be used in any of the drive, idler, or tensioning pulley arrangements.

Referring now to FIG. 5, one embodiment of the first hub 14, functioning as a follower hub 14c, is illustrated. In general, each of the hubs 14a–c, 15a–c is similarly constructed including a central portion 22 having a first end 58 that faces outward from the central volume 56 of the bladed pulley and an opposite second end 60. A central bore 62 extends through the hubs 14a–c, 15a–c from the first end 58 to the second end 60. The central bore 62 has a longitudinal axis B—B.

The central portion 22 of follower hub 14c includes a plurality of slots 30 (see also FIG. 3, hub 15). The number of slots 30 corresponds to the number of blades 12 of the bladed pulley. Each of the slots 30 has a width that is sized and configured for receipt of the blades 12. In an alternative embodiment, the hubs can include flanges (not shown) radially extending from the central portion 22. The flanges can be located at either or both of the first and second ends 58, 60 of the central portion 22 and include a plurality of slots corresponding to the number and size of the blades.

In a hub constructed as a follower hub 14c (FIG. 5) the central bore 62 of the hub 14c has an internal diameter sized and configured to receive a bearing 34. The central bore 62 can be sized and configured to receive many types of bearings, such as ball or journal bearings or bushings. Preferably, the central bore 62 is sized and configured to receive bearings 34 that are of a standard size and type, so that a user can easily obtain replacement bearings for maintenance purposes.

An adapter portion 118 is positioned within the bearing 34 to permit the bladed pulley to freely rotate about the longitudinal axis B—B of the hub 14c. The adapter portion 118 is configured to receive an axle 120. In the illustrated embodiment, the adapter portion 118 is structured in correspondence to a hex-shaped axle 120.

Unlike the follower hub 14c, the central bore 62 of the drive hub 14a, shown in FIG. 2, includes drive structure 26 to rotationally drive or propel the bladed pulley, rather than a bearing and adapter portion that permits free rotation. In the illustrated embodiment the drive structure 26 is an internal hex concentrically configured along the longitudinal axis B—B of the hub 14a. Other drive structure for transferring rotational power to the hub, and therein to the bladed pulley, may be used. For example, the drive structure may include a spline, a keyway, or a flanged joint. Similarly, the adapter portion of the follower hub can include other adapter structure configured to correspond to other types of axle configurations.

FIG. 3 illustrates one embodiment of the bladed pulley 10 including a drive hub 14 and a follower hub 15. As can be seen, the central portions 22 of the hubs 14, 15 are configured with different outer diameters. In particular, the follower hub 15 is sized to accommodate a bearing 34 (FIG. 5). The drive hub 14 need be sized only to accommodate a drive shaft 88 (FIG. 2). Thus, in this embodiment, the drive hub 14 has an outer surface 31 to which the inner edge 54 of the blades 12 can be secure (e.g. welded). The follower hub 15 is configured with slots 30 that receive the other end of each blade 12. Preferably the outer surface 31 of the drive hub 14 and the slots 30 of the follower hub 15 are correspondingly arranged and configured to position the inner edges 54 of the blades 12 in a substantially parallel relationship with the longitudinal axis A—A of the pulley 10.

Referring back to FIG. 5, the axle 120 can include notches 122 that correspond to the slots 178 of the support structure 172, 174. The notches fix the axles in a non-rotational position, yet permit the axles 120, and the bladed pulley 10c, to freely float within the slots 178 for tensioning purposes, as previously described. The axles 120 of the tensioning pulley 10c can include a threaded hole 124 for receipt of fasteners 126 (only one shown) that secure that tensioning pulley 10c within the slots 178. In the illustrated embodiment, a washer 128 is positioned between the fastener 126 and the support structures 172, 174. Other types of structure that function to secure the tensioning pulley 10c within the slots 178 of the support structures can be used in accordance with the principles disclosed.

Referring back to FIG. 3, the blades 12 of the bladed pulley 10 extend from the first hub 14 to the second hub 15. In a preferred embodiment, the blades 12 are of a monolithic construction. In other words, the blades 12 are designed to extend from the first hub 14 to the second hub 15 without segmentation. This design permits ease in manufacture as there is no added process to create joints or mating seams. This design also permits ease in assembly as the blades are unitary and not required to be fit or joined together.

Referring now to FIG. 6, one embodiment of a blade 12 in accordance with the principles disclosed is illustrated. The blade 12 has a length L1, a width W1, and preferably a tapering height H1 to H2. The length L1 of the blade extends between a first end 40 of the blade and a second end 42 of the blade. In use with a merging machine, for example, the length L1 of the blade 12 is typically within the range of 24 and 48 inches; preferably, the length L1 of the blade 12 is about 34 inches. The width W1 of the blade is defined between a first planar surface 94 and a second opposite planar surface 96. Typically the width W1 of the blade 12 is within the range of 0.100 and 0.200 inches; preferably, the width W1 of the blade 12 is about 0.134 inches.

The blade 12 defines a crown profile 68 and tapers from a central region 38 to the ends 40, 42 of the blade 12. The height H1, H2 is defined between an inner edge 54 and an outer edge 66 of the blade 12. In the illustrated embodiment, the height H1 at the central region 38 of the blade 12 is within the range of 2.0 and 4.0 inches; preferably about 2.25 inches. The height H2 at each of the ends 40, 42 is within the range of 1.0 and 3.0 inches; preferably about 1.625 inches. In the shown embodiment, the arcs or tapers of the blades 12 have an angular dimension A of between 0.5 degrees and 1.0 degrees.

Referring still to FIG. 6, the crown profile 68 of the blade 12 is located at the central region 38 of the blade 12 along the outer edge 66. The crown profile 68 eliminates the need for expensive machining used to provide a tracking profile as found on most conventional pulleys having a solid cylindrical surface. In particular, the crown profile 68 includes a raised drive edge 98 at the central region 38 of the blade. The drive edge 98 provides a line contact that engages the inner surface 154 of the conveyor belt 150 to drive the belt with minimal slip. The drive edge 98 further maintains proper alignment of the belt.

As illustrated in FIG. 3, the bladed pulley 10 preferably includes twelve blades 12. It is contemplated that more or fewer blades can be used in accordance with the principles disclosed. In particular, more blades can be added in applications where the material is more difficult to chop or is generally smaller in size so that the material easily falls through the open volume between the blades. In the alternative, fewer blades can be used in applications where the material is easier to chop or is generally larger in size requiring more of an open design to permit the material to fall through the blades 12 and free from the pulley 10.

The orienting bulkheads 16 of the bladed pulley 10 are provided to orient and properly space the blades 12. In one preferred embodiment, illustrated in FIG. 7, the orienting bulkhead 16 includes a wheel-shaped disc 84 having a plurality of bulkhead slots 44. Preferably, the number of bulkhead slots 44 corresponds to the number of blades 12 of the bladed pulley 10. The bulkhead 16 illustrated in FIG. 7 also includes a central through hole 46 defining a central axis C—C. The central through hole 46 may or may not be formed within the bulkhead, as the bladed pulley 10 preferably operates without a central shaft. Yet, the bulkhead may be configured with the central through hole 46 in applications where a central shaft is desired, or in applications where weight reduction is advantageous.

The bulkhead slots 44 extend radially away from the central axis C—C of the bulkhead 16. In particular, the slots 44 extend from a slot seat 72 adjacent the central through hole 46 to an outer perimeter 76 of the bulkhead 16. Each of the slots has a width that is sized and configured for receipt of one of the blades 12. The slot seats 72 of the bulkhead 16 are located a distance r2 from the central axis C—C of the bulkhead 16.

The slots 44 of the bulkhead 16 position the blades 12 about the central axis C—C of the bulkhead 16 at predetermined intervals B. Preferably the intervals B are uniformly spaced about the central axis C—C. In the illustrated embodiment, the slots 44 are spaced at intervals B of approximately 30 degrees. For embodiments having a number of blades different than that of the illustrated embodiment, the intervals may be greater than or less than approximately 30 degrees. In the alternative, the intervals may be non-uniform or varied at particular locations about the longitudinal axis of the pulley in applications where such an arrangement is advantageous. For ease of manufacture of the orienting bulkhead 16, the slots can be formed by a laser cutting process. Other manufacture processes, however, that angularly orient and position the slots with sufficient accuracy to thereby orient and position the blades, may be used.

Figure 8:
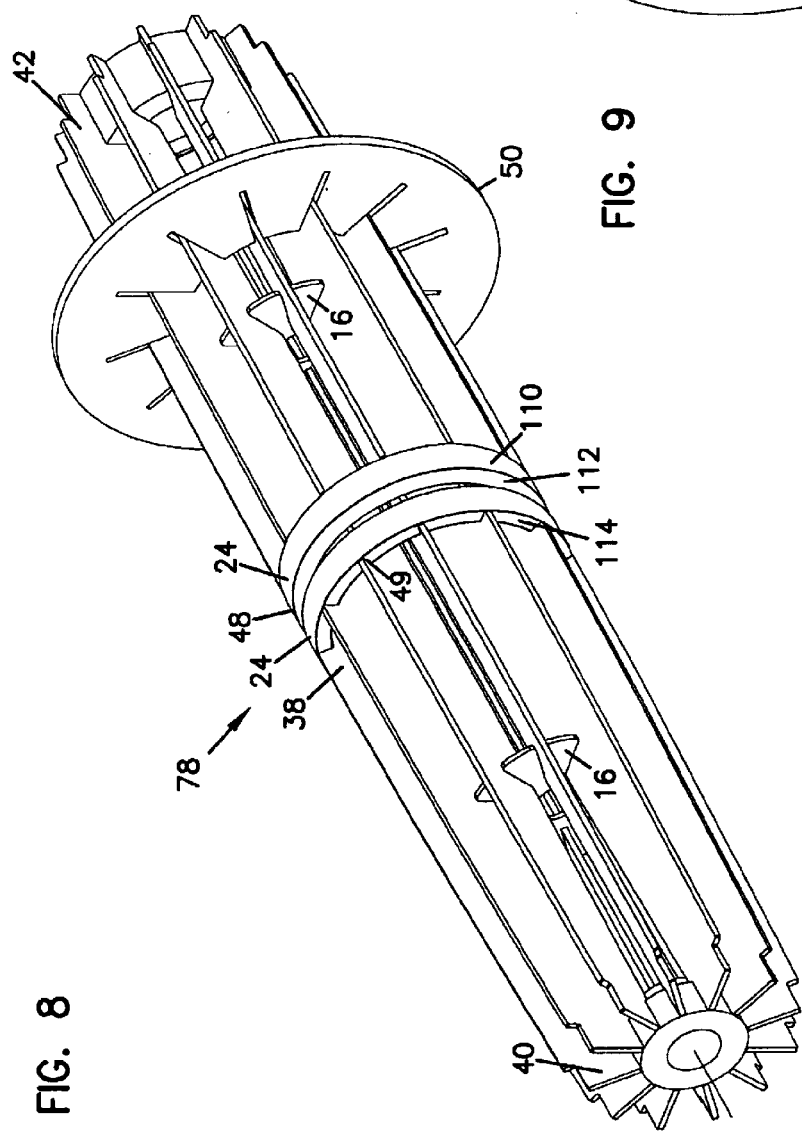
FIG. 8 is a perspective view of the bladed pulley of FIG. 3, shown with an assembly tool.

Referring now to FIGS. 3 and 8, the bladed pulley 10 further includes rings 24 positioned adjacent one another at the central region 38 of the blades 12. The rings 24 define a Vee-guide groove 48 that corresponds to guide structure (not shown) formed on the inner surface 154 of the conveyor belt 150 (FIGS. 1 and 2).

III. Assembly of the Bladed Pulley

The bladed pulley 10 is designed to: ease efforts in manufacture and assembly, maintain structural integrity and accuracy, and lessen the overall weight of a pulley. For example, the monolithic construction of the blades 12 assists in the manufacture of the bladed pulley; the orienting bulkhead 16 and slotted hub flanges 14, 15 maintain the structural integrity and blade position accuracy of the pulley; and the open volume design reduces the overall weight of the bladed pulley 10. In addition to these exemplary advantages, the bladed pulley is designed for ease of assembly.

Figure 4:
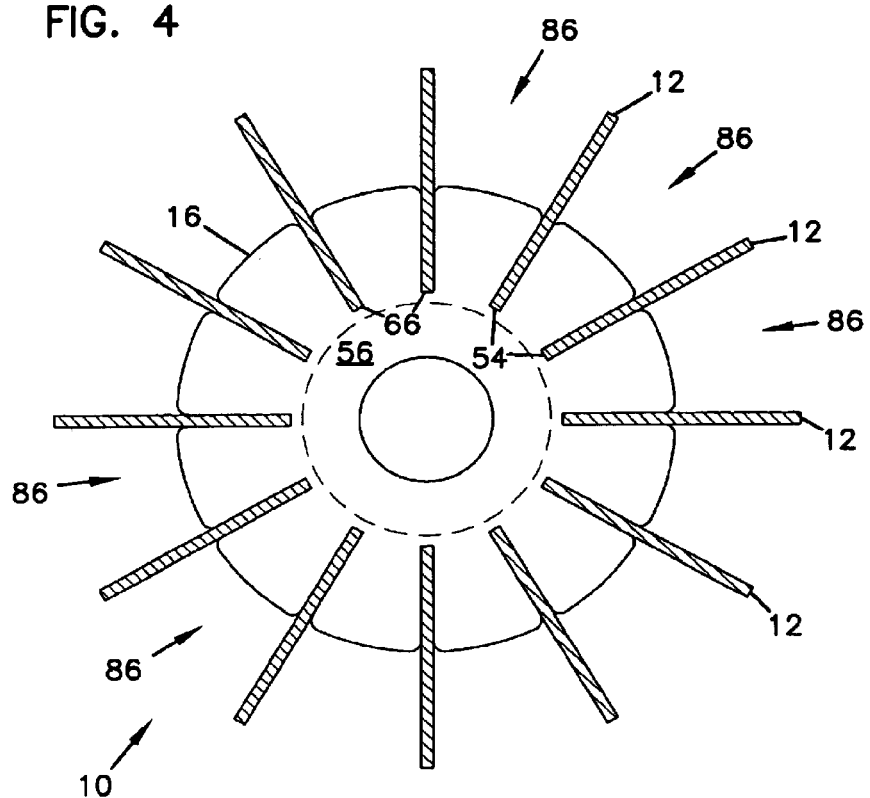
FIG. 4 is a cross-sectional view of the bladed pulley of FIG. 3, taken along line 4—4.

Referring now to FIGS. 3 and 8, the bladed pulley 10 is provided with two bulkheads 16. The bulkheads 16 are positioned approximately halfway between a midpoint 78 of the blades 12 and the ends 40, 42 of the blades 12. Each of the blades 12 is positioned within the bulkhead slots 44 such that the inner edge 54 of the blade 12 contacts the slot seat 72 (FIGS. 4 and 7).

Each of the blades 12 is secure in a position relative to the bulkheads 16. In one method of assembly, the blades 12 and bulkheads 16 may be permanently welded together. In another method of assembly, the blades and bulkheads can be detachably, or permanently, secured together with conventional fasteners, such as bolts or rivets. It is further contemplated that a separate bracket or ring may be used to couple the blades and bulkheads together in fixed relation.

Figure 9:
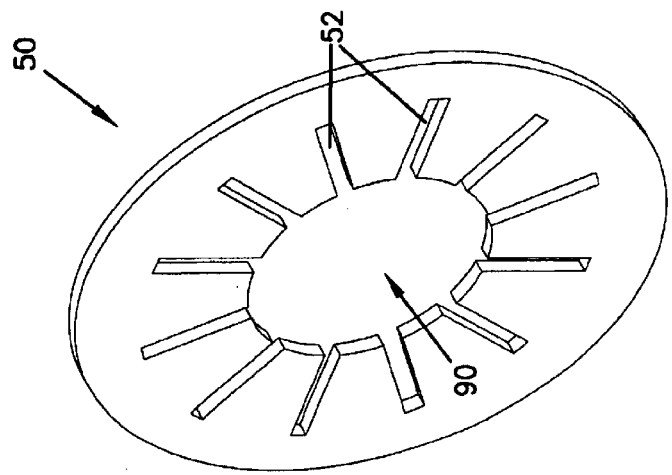
FIG. 9 is a perspective view of the assembly tool shown in FIG. 8.

As shown in FIG. 8, an assembly tool 50 can be used to properly align the blades 12 when coupling the blades 12 in fixed relation to the orienting bulkheads 16. The assembly tool 50 has a central opening 90 (FIG. 9) and a plurality of slots 52. The slots 52 radially extend from the central opening 90 and preferably correspond to the number of blades 12 of the bladed pulley 10. As the blades 12 are inserted within the each of the bulkhead slots 44, the blade may also be inserted within the assembly tool slots 52 (FIG. 8). The assembly tool 50 can be slid along the lengths of the blade or blades 12 to a position that stabilizes and properly orients the blades relative to one another. In one method of assembly, the tool 50 is used to position each of the blades 12 prior to coupling or securing all the blades 12 in fixed relation to the bulkheads 16. In another method, the tool 50 is used to position and secure the blades one at a time.

Still referring to FIG. 8, when each of the blades 12 is coupled to the bulkheads 16, the assembly tool 50 can be slid off the blades 12. The blades 12 extend radially from the central axes C—C of the bulkheads 16. The central axes C—C of the bulkheads 16 are preferably coaxially aligned to define the longitudinal axis A-A of the bladed pulley 10 (See FIG. 3).

To position the first hub 14, each of the slots 30 of the central portion 22 is aligned with the first ends 40 of the each blade 12. The blade ends 40 are slid within the slots 30 and can be secured to the hub 14 by weldments. The second hub 15 is similarly assembled to the second ends 42 of the blades 12. Preferably the first and second hubs 14, 15 are coaxially aligned with the central axes C—C of the bulkheads 16. In particular, the longitudinal axes B—B of the hubs 14, 15, and the central axes C—C of the bulkheads, coaxially align to define the longitudinal axis A—A of the bladed pulley 10.

The rings 24 are positioned about the outer circumference of the bladed pulley 10. In particular, the rings 24 are placed within a notch 47 (FIG. 6) formed in the outer edges 66 of the blades 12. In the illustrated embodiment of FIG. 8, the rings 24 include a circumferential surface 110, a groove surface 112, and a locating surface 114. In assembly, each ring is positioned about the blades 12 so that the locating surface 114 contacts a notch comer 49 (FIG. 6) of the blade notch 47. The notch comer 49 maintains the placement of the rings 24. The rings 24 are seamed or secured by conventional methods. Each of the groove surfaces 112 of the rings 24 partially defines the Vee-guide groove 48 that receives a guide rib 185 (FIG. 10) of the conveyor belt 150. The Vee-guide groove 48 assists in maintaining proper position of the belt 150 in relation to the blade pulley 10.

In use, the bladed pulley 10 easily mounts to the axles or drive shafts of equipment. The bladed pulley is designed so that an operator can easily exchange one bladed pulley 10 for another by simply removing the pulley 10 from the axles 120 or shafts 88 and installing a replacement pulley. As shown, neither the axle 120 nor the drive shaft 88 extend through the length of the bladed pulley 10 or extend through the open volume of the bladed pulley 10, making replacement of the pulley a simpler task.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A pulley for use with a conveyor belt, the pulley comprising:
   (a) a first end, a second end, and a longitudinal axis extending between the first and second ends;
   (b) a first hub and a second hub positioned at corresponding first and second ends of the pulley, the first and second hubs being coaxially aligned with the longitudinal axis of the pulley;
   (c) at least a first orienting member, the first orienting member including:
      (i) a central portion aligned with the longitudinal axis; and
      (ii) a plurality of slots radially extending from the central portion;
   (d) a plurality of blades, each of the blades including:
      (i) a first end mounted proximate the first hub;
      (ii) a second end mounted proximate of the second hub; and
      (iii) an intermediate section located between the first end and the second end, the intermediate section being positioned within one of the plurality of slots of the first orienting member, each of the blades being oriented to radially extend outward from the longitudinal axis of the pulley; and
   (e) a central volume defined within inner edges of the plurality of blades and the first and second hubs, the central volume being free of obstructions extending between the first hub and the second hub.

2. The pulley of claim 1, wherein the first hub includes a first central portion defining a plurality of first hub slots, the first hub slots being sized for receipt of the first ends of the plurality of blades.

3. The pulley of claim 2, further including a first bearing operably positioned within a first central bore of the first hub to permit axial rotation of the pulley.

4. The pulley of claim 2, wherein the second hub includes a second central portion defining a plurality of second hub slots, the second hub slots being sized for receipt of the second ends of the plurality of blades.

5. The pulley of claim 4, wherein the second hub is configured for receipt of a drive member to provide axial rotation of the pulley.

6. The pulley of claim 1, wherein the at least a first orienting member is space apart from each of the first and second ends of the pulley.

7. The pulley of claim 1, wherein each of the blades has a non-segmented length defined between the first end of the blade and the second end of the blade, the non-segmented length of each blade extending from the first hub to the second hub.

8. The pulley of claim 7, wherein each of the blades has a height defined between a first edge located adjacent the longitudinal axis and a second opposite edge; and each of the blades has a width defined between a first planar surface and a second opposite planar surface, the width being less than the height of each blade.

9. The pulley of claim 1, wherein the plurality of blades includes twelve blades spaced at generally uniform intervals about the longitudinal axis.

10. The pulley of claim 1, further including at least a first guide structure disposed about a circumference of the pulley to maintain proper positioning of the conveyor belt relative to the pulley.

11. The pulley of claim 1, wherein each of the plurality of blades includes a crowned profile that contacts the conveyor belt.

12. The pulley of claim 11, wherein the crowned profile includes a raised central portion having a drive edge, the drive edge configured to contact the conveyor belt.

13. A pulley for use with conveyor systems, the pulley comprising:
   (a) a first rotary arrangement;
   (b) a second rotary arrangement positioned opposite the first rotary arrangement;
      (i) the first and second rotary arrangements defining first and second ends of an open volume of the pulley;
   (c) a plurality of blades radially projecting from the open volume, the blades being supported at opposite ends by the first and second rotary arrangements; and
   (d) a first axle supported by the first rotary arrangement and a second axle supported by the second rotary arrangement, the first and second axles extending only externally of the open volume of the pulley.

14. A conveyor system comprising:
   (a) a plurality of pulleys, including a drive pulley and an idler pulley, the pulleys including:
      (i) a first end and a second opposite end;
      (ii) a longitudinal axis extending from the first end to the second end;
      (iii) a plurality of blades extending in a radial direction from the longitudinal axis;
      (iv) a center volume defined within the plurality of blades and between the first and second ends;
      (v) a first axle arranged to rotationally support the first end of the pulley, the first axle extending only outward from the center volume;
      (vi) a second axle arranged to rotationally support the second end of the pulley, the second axle extending only outward from the center volume; and
   (b) a belt for conveying material, the belt circumscribing the plurality of pulleys.

15. The conveyor system of claim 14, wherein the belt includes a hinged connection arrangement, the hinged connection arrangement including:
   (a) a hinge pivotally connecting a first end and a second end of the belt; and
   (b) a plurality of fasteners that secure the hinge in a folded position such that the first end of the belt is in contact with the second end of the belt.

16. The conveyor system of claim 14, wherein the plurality of pulleys further includes a plurality of open regions defined between adjacent blades of the plurality of blades, the plurality of open regions extending in a radial direction from the center volume to permit conveyed material to fall through the center volume of the pulley.

17. The conveyor system of claim 14, further including an adjustable pulley arranged to tension the belt.

18. The conveyor system of claim 17, wherein the adjustable pulley includes:
   (a) a first end and a second opposite end;
   (b) a longitudinal axis extending from the first end to the second end;
   (c) a plurality of blades extending in a radial direction from the longitudinal axis;
   (d) a center volume defined within the plurality of blades and between the first and second ends;
   (e) a first axle arranged to rotationally support the first end of the adjustable pulley, the first axle extending only outward from the center volume; and
   (f) a second axle arranged to rotationally support the second end of the adjustable pulley, the second axle extending only outward from the center volume.

* * * * *